(12) United States Patent
Sanchez

(10) Patent No.: US 11,839,250 B2
(45) Date of Patent: Dec. 12, 2023

(54) CLOTHING CUFF CLIP WITH CONTAMINATION INDICATOR

(71) Applicant: Daniel Sanchez, San Antonio, TX (US)

(72) Inventor: Daniel Sanchez, San Antonio, TX (US)

(*) Notice: Subject to any disclaimer, the term of this patent is extended or adjusted under 35 U.S.C. 154(b) by 0 days.

(21) Appl. No.: 16/175,823

(22) Filed: Oct. 30, 2018

(65) Prior Publication Data

US 2020/0128895 A1 Apr. 30, 2020

(51) Int. Cl.
*A41F 17/02* (2006.01)
*G01N 21/29* (2006.01)
*G01N 21/94* (2006.01)
*G01N 21/81* (2006.01)
*G01N 21/80* (2006.01)
*G01N 21/88* (2006.01)

(52) U.S. Cl.
CPC ........... *A41F 17/02* (2013.01); *G01N 21/293* (2013.01); *G01N 21/80* (2013.01); *G01N 21/81* (2013.01); *G01N 21/8803* (2013.01); *G01N 21/94* (2013.01)

(58) Field of Classification Search
CPC ........... A41F 17/00; A41F 17/02; A41F 17/04
See application file for complete search history.

(56) References Cited

U.S. PATENT DOCUMENTS

| | | | |
|---|---|---|---|
| 1,166,174 A | 12/1915 | Bisbee | |
| 2,494,613 A * | 1/1950 | Gordos | D06F 55/02 24/567 |
| 2,871,538 A * | 2/1959 | Richardson | D06F 55/02 24/338 |
| 3,282,479 A | 11/1966 | Esterbrooks | |
| D235,174 S | 5/1975 | Gardner | |
| 4,038,726 A * | 8/1977 | Takabayashi | A44B 11/06 24/186 |
| 4,115,906 A | 9/1978 | Lavine et al. | |
| 4,825,475 A | 5/1989 | Smart | |
| 4,914,791 A | 4/1990 | Lorber | |
| 4,947,524 A | 8/1990 | Chang | |
| 5,082,153 A | 1/1992 | Duester et al. | |
| 5,787,511 A | 8/1998 | Garside | |
| 6,247,183 B1 | 6/2001 | Haas-Laursen | |
| 6,618,862 B1 | 9/2003 | Bunjes | |
| 6,865,751 B1 | 3/2005 | Brasher | |
| 7,086,123 B2 | 8/2006 | Carter | |

(Continued)

*Primary Examiner* — Sally Haden
(74) *Attorney, Agent, or Firm* — KAMMER BROWNING PLLC

(57) ABSTRACT

A clothing cuff clip attachable to an article of clothing, especially a pants leg cuff, to gather and lift the clothing up from an adjacent surface and provide a modest barrier between the surface and the clothing item being worn. The clothing cuff clip is inexpensive to manufacture in large quantities and may be disposable after extended use. The clip is easy to attach to the lower back edge of the pants leg cuff on the item of clothing being worn and yet remains securely attached even after extended use. Optionally, a contamination indicator that changes in appearance when subjected to significant moisture, a change in pH, or the presence of a selected contaminant material, is positioned on the lower floor contact area of the clip to provide the wearer with an indication of when the clip, and therefore the item of clothing, has come into contact with contaminated materials.

11 Claims, 4 Drawing Sheets

(56) References Cited

U.S. PATENT DOCUMENTS

| | | | |
|---|---|---|---|
| D536,516 S | 2/2007 | Sanders | |
| 7,237,306 B1 | 6/2007 | Flowers et al. | |
| 7,272,862 B1 | 9/2007 | Ellington | |
| 7,743,431 B2 | 6/2010 | Mehren et al. | |
| 7,797,762 B2 | 9/2010 | Shapiro et al. | |
| D629,600 S | 12/2010 | Mandalia | |
| 7,854,019 B2 | 12/2010 | Delaney | |
| 8,006,632 B2 | 8/2011 | Schlesinger | |
| 8,424,231 B2 | 4/2013 | Sliwa | |
| 9,044,054 B2 | 6/2015 | Raymer, Jr. | |
| 11,259,582 B2 * | 3/2022 | Efrat | A41F 1/00 |
| 2003/0101545 A1 * | 6/2003 | Hsiao | B42F 1/02 |
| | | | 24/67.9 |
| 2005/0108856 A1 * | 5/2005 | Ching | A45F 5/04 |
| | | | 24/7 |
| 2009/0064919 A1 | 3/2009 | Greenwald | |
| 2009/0260199 A1 * | 10/2009 | Nashief | A41F 17/02 |
| | | | 24/499 |

\* cited by examiner

CLOTHING CUFF CLIP WITH CONTAMINATION INDICATOR

BACKGROUND OF THE INVENTION

1. Field of the Invention

The present invention relates generally to attachments and accessories for items of clothing. The present invention relates more specifically to devices that facilitate the maintenance of cuffed edges of clothing and thereby reduce the risk of such cuffed edges collecting and spreading contaminants.

2. Description of the Related Art

Most items of clothing require washing and/or cleaning after a period of use as they become soiled over time through contact with the wearer and, in many cases, with the wearer's environment. In most situations, the accumulation of contaminants from the environment on items of clothing poses no specific health risk as the contaminant materials are typically inert or contain such low levels of infectious organisms as to be unlikely to spread germs or other contagions. Hospitals and other healthcare facilities, on the other hand, are well known as environments where infected and/or contaminated surfaces abound. Articles of clothing worn in such healthcare environments will become contaminated, especially if elements of the items of clothing, such as cuffs on pants and shirts, are in regular contact with unclean surfaces.

The article of clothing most likely to come into regular contact with contaminated surfaces in a healthcare facility environment are the pants of healthcare providers, especially the uniform type pants typically worn by healthcare providers know as "scrubs" or "scrub pants". These uniform objects of clothing are often provided to the workers within a facility in small, medium, and large sizes, each of which are designed to fit loosely on the wearer. This loose fit, while comfortable to the wearer, generally guarantees that the pants leg cuffs will drag on the floor and/or be regularly caught under the wearer's shoes as they move about the facility. While efforts to disinfect floor surfaces in healthcare facilities are continuously being made, workers are constantly moving from areas that may have recently become contaminated (such as operating room floors) into areas that may have been recently cleaned, thereby quickly contaminating the previously clean surfaces and facilitating the rapid spread of germs and other pathogens within the facility.

Providing better fitting clothing might be a solution to the problem, but such would be expensive given the wide range in clothing sizes that would be required. Add to this the fact that most healthcare providers prefer the loose-fitting scrubs and it becomes apparent that another solution is required. It would be difficult to fundamentally modify the nature of the clothing currently being worn in most healthcare facilities or to modify the manner in which healthcare providers readily move from place to place within a facility. Currently, the manner in which pants leg cuffs, such as those of medical scrubs, drag across floor surfaces in healthcare facilities, significantly contributes to the spread of unwelcome contaminants within the facilities.

It would, therefore, be desirable to have a mechanism for reducing the amount of contact between contaminated floor surfaces and the articles of clothing worn by those who regularly traverse those surfaces. It would be desirable if such a mechanism could gather the edges of an item of clothing, such as the cuffs of scrub pants, to lift them up off the floor and at the same time provide a barrier between the contaminated floor surface and the article of clothing being worn. Such a mechanism would preferably be versatile enough to be used with a range of clothing items in a range of sizes. It would be desirable if such a mechanism was inexpensive to the point of being disposable and was easy to use (i.e. easy to put on the article of clothing and generally secure in its attachment). It would be a further benefit if the mechanism provided an indication of the degree to which the clothing item it is associated with has been in contact with contaminated surfaces.

SUMMARY OF THE INVENTION

The present invention therefore provides a clothing cuff clip attachable to the cuff of an article of clothing, especially a pants leg cuff, to gather and lift the cuff up away from the floor surface and to provide a modest sized barrier between the floor surface and the clothing item being worn. The clothing cuff clip is inexpensive to manufacture in large quantities and may be disposable after extended use. The clip is easy to attach to the lower back edge of the pants leg cuff on the item of clothing being worn and yet remains securely attached even after extended use. Optionally, a contamination indicator that changes in appearance when subjected to significant moisture and/or a significant change in pH or chemical composition may be positioned on the lower floor contact area of the clip to provide the wearer with an indication of the degree to which the clip, and therefore the item of clothing, has come into contact with contaminated materials.

BRIEF DESCRIPTION OF THE DRAWINGS

FIG. 5 is an elevational view from the rear of an individual wearing two of the clothing cuff clips of the present invention on the pants leg cuffs typically associated with scrubs uniform pants used in healthcare facilities and the like.

DETAILED DESCRIPTION OF THE PREFERRED EMBODIMENTS

Figure 1:
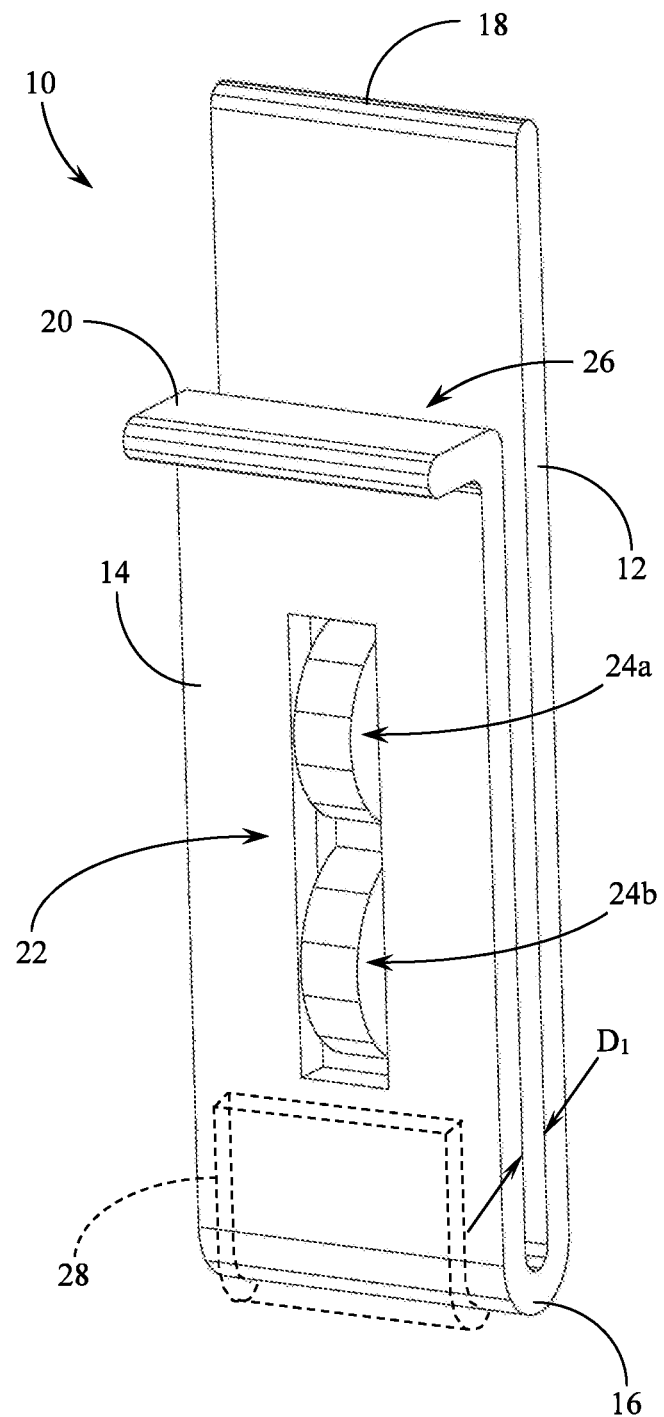
FIG. 1 is a perspective view of a first preferred embodiment of the clothing cuff clip of the present invention shown with optional contamination indicator.

Reference made first to FIG. 1 for a description of the basic construction of clothing cuff clip of the present invention, as structured to solve the problems and meet the objectives outlined above. FIG. 1 is a perspective view of a first preferred embodiment of the clothing cuff clip of the present invention shown with optional contamination indicator. In this view, cuff clip 10 is seen to be constructed primarily of first clip member 12 and second clip member 14. Clip members 12 & 14 are preferably constructed from a shaped flat band of rigid or semi-rigid material such as a hard plastic (molded or extruded polymer material as examples) or metal (aluminum or stainless steel as examples). The clip material should have a resiliency after being formed such that the clip may be opened slightly to insert an edge of the clothing item and spring back to close on and exert a gripping force on the clothing. Various materials that meet these requirements are known in the art, many of which are inexpensive, easy to shape and form, and frequently recyclable.

As mentioned, clip members 12 & 14 are preferably part of a single band of material that is shaped to form "U" shaped clip base 16 which establishes a 180 degree bend in the material. An upper end of clip member 12 forms clip top tab 18 which extends beyond an upper edge of clip member 14. Clip member 14 terminates in clip lift tab 20 which in the preferred embodiment is simply a 90 degree bend in the terminal edge of the clip member. The described structure of the top part of cuff clip 10 provides the means for manipulating the clip into place on the clothing cuff and inserting the edge of the cuff into the clip. Prior to use, clip opening 26 is preferably closed (by press-through ridges 24a & 24b as described in more detail below) as a result of the residual spring force left in the clip structure during manufacture and opens slightly under modest force when the user directs the edge of the clothing cuff into the opening.

While cuff clip 10 could function with only the above described structural features, the preferred embodiment of the present invention incorporates further elements that facilitate the secure attachment of the mechanism to the fabric cuff of the pants leg of the user. Clip member 14 defines press-through aperture 22 forming a slot generally in the center of the clip member. This slot formed by press-through aperture 22 aligns with and is sized to receive press-through ridges 24a & 24b with one or more fabric layers of the clothing cuff pressed between them. Given the relatively thin fabric materials of the typical scrubs pants leg cuff, this combination of press-through aperture 22 and press-through ridges 24a & 24b provide a stronger, yet still removable, attachment to the clothing edge.

Use of the clothing cuff clip of the present invention involves placing one clip on each of the two pants leg cuffs of the clothing item being worn by the user. In most cases, cuff clip 10 is secured to a gathered edge of the clothing rather than the single layer of fabric that forms the lower edge of the cuff. The user might choose to roll the cuff up before securing the clip or simply bunch the fabric into the clip so that the clip serves to lift the edge of the cuff up from contact with the floor. Because the front of the "too long" pants leg is typically held up by the front of the shoe of the wearer, a clip structured as that of the present invention is all that is required to lift the balance of the edge of the cuff up off of the floor. If some part of the back side of the cuff falls into contact with the floor surface it will be clip base 16 which forms a modest barrier between the contaminated floor and the clothing fabric bunched up within the clip. Once again, the residual spring force in the clip material should be sufficient to maintain the clip in position on the pants leg cuff even as the clip is worn for extended periods and time and comes into frequent contact (as being dragged across, for example) with floor surfaces.

An optional additional feature of the present invention is shown in broken line form in FIG. 1 as contamination indicator 28. As mentioned above, it would be desirable for the user of the present invention to have some indication of the degree to which the item of clothing they are wearing has come into contact with contaminated or potentially contaminated surfaces. In the preferred embodiment, contamination indicator 28 is a layer of material positioned over clip base 16 that extends a distance up the outer faces of clip members 12 & 14 to establish a portion of the cuff clip that first contacts the floor surface during use. Whatever contaminant compounds might be transferred from the floor to the cuff clip will therefore first contact and be received by contamination indicator 28. The preferred properties of the material from which contamination indicator 28 is made are simply that it be capable of absorbing (over time) a quantity of contaminant material from the floor surface and to thereafter provide a visual indication of the accumulated presence of that contaminant material.

In some embodiments of the present invention, contamination indicator 28 may itself be a replaceable clip that is removably secured to clip base 16. Although the entire cuff clip 10 is preferably disposable, some embodiments (such as with stainless steel cuff clips) may benefit from the replacement of just the contamination indicator after a period of use. A removable contamination indicator 28 for use with a stainless steel clip (for example) would comprise a plastic clip with a porous layer of material on its outer surface that could be clipped onto or removed from clip base 16 as needed. An indentation (not shown) in the external surface of the cuff clip in the area around clip base 16 would facilitate retention of the removable contamination indicator.

There are any number of absorbent polymer materials (such as those used in sponge mops and the like) that can serve as an appropriate substrate for the retention of a color changing substance that responds to the accumulated presence of water or of specific chemical compositions. In its simplest form, contamination indicator 28 may indicate the accumulated presence of moisture, which alone is a reasonable indication that potentially contaminated compounds have been picked up from the floor surfaces traversed by the user. Alternately, the substrate material of contamination indicator 28 may be impregnated with a quantity of one or more chemicals that provide visual indications (color changes) of a change in pH or of the presence of a specific contaminant compound. Such a contamination indicator provides the user with information regarding an appropriate duration of use for the cuff clip (before it should be disposed of) and of the clothing item to which it is secured (before it should be washed).

Figure 2:
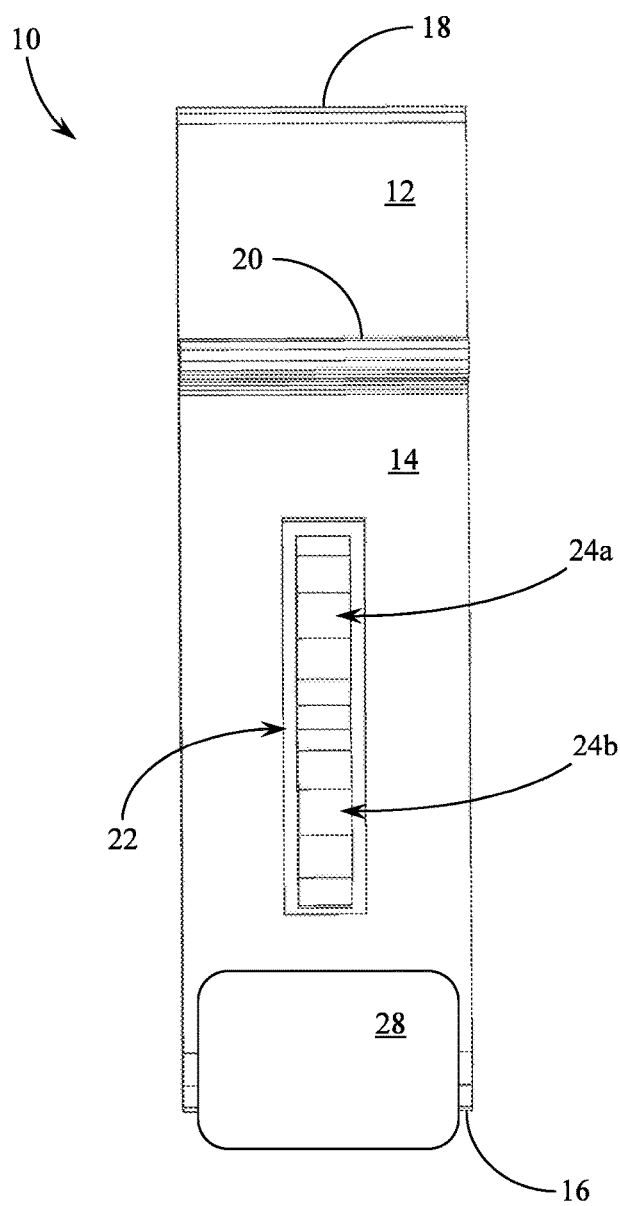
FIG. 2 is a front plan view of the clothing cuff clip of the present invention disclosed in FIG. 1, shown with the optional contamination indicator in place.
Figure 3:
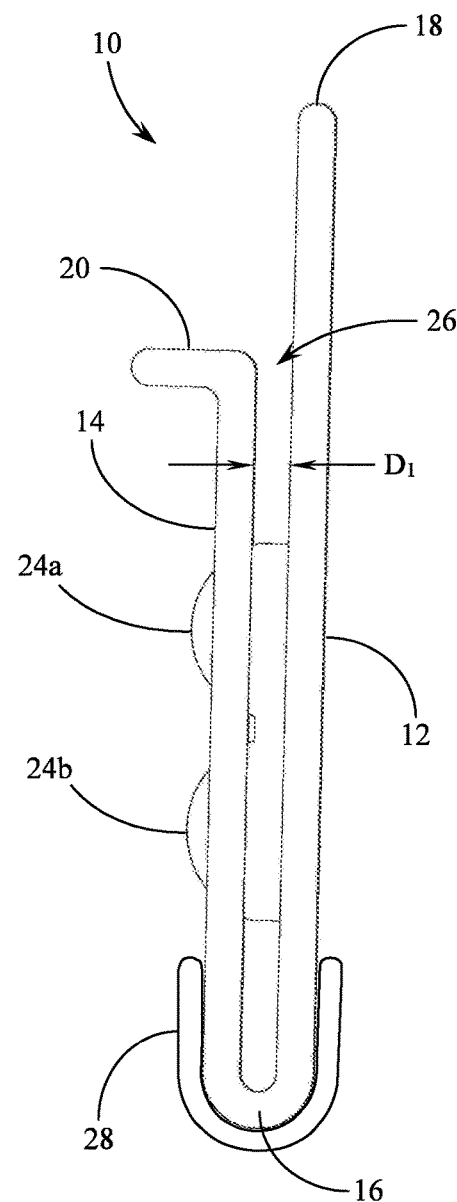
FIG. 3 is a side plan view of the clothing cuff clip of the present invention disclosed in FIG. 1, shown with the optional contamination indicator in place.

Reference is next made to FIGS. 2 & 3 which provide additional views of cuff clip 10 of the first preferred embodiment of the present invention as shown in FIG. 1. FIG. 2 is a front plan view of the clothing cuff clip of the present invention disclosed in FIG. 1, shown with the optional contamination indicator in place. FIG. 3 is a side plan view of the clothing cuff clip disclosed in FIG. 1, again shown with the optional contamination indicator in place.

In the views of FIGS. 2 & 3, cuff clip 10 is again seen to be constructed primarily of first clip member 12 and second clip member 14. As best seen in FIG. 3, clip members 12 & 14 are constructed from a shaped flat band of rigid or semi-rigid material such as a hard plastic or metal. Clip members 12 & 14 are part of a single band of material that is shaped to form "U" shaped clip base 16. An upper end of clip member 12 forms clip top tab 18 extending beyond an upper edge of clip member 14. Clip member 14 terminates in clip lift tab 20 that facilitates manipulation of the clip by the wearer. Prior to use, clip opening 26 is preferably closed (by press-through ridges 24a & 24b as described in more detail below) again as a result of the residual spring force left in the clip structure during manufacture and opens slightly under modest force when the user directs the edge of the clothing cuff into the opening. A separation distance $D_1$ between clip members 12 & 14 should be wide enough to receive and retain multiple layers of fabric comprising the cuff of the article of clothing.

FIGS. 2 & 3 more clearly show the manner in which clip member 14 defines press-through aperture 22 forming a slot generally in the center of the clip member (see especially FIG. 2). This slot formed by press-through aperture 22 aligns with and is sized to receive press-through ridges 24a & 24b, again with one or more fabric layers of the clothing cuff pressed between them. It will be recognized that the layers of fabric do not need to be pressed fully through aperture 22 in order to benefit from the additional spring force developed by the aperture/ridge arrangement to better secure the clip to the cuff.

Finally, in FIGS. 2 & 3 the placement and positioning of contamination indicator 28 can be seen. The goal of the structure of contamination indicator 28 is to be the first, and perhaps only, part of the clip that makes direct contact with the floor surface. Some extension of the material making up the contamination indicator on both clip member 12 (for purposes of having a visual indication of its condition) and clip member 14 (for purposes of dragging on the floor surface when the user walks forward) is preferable.

Figure 4:
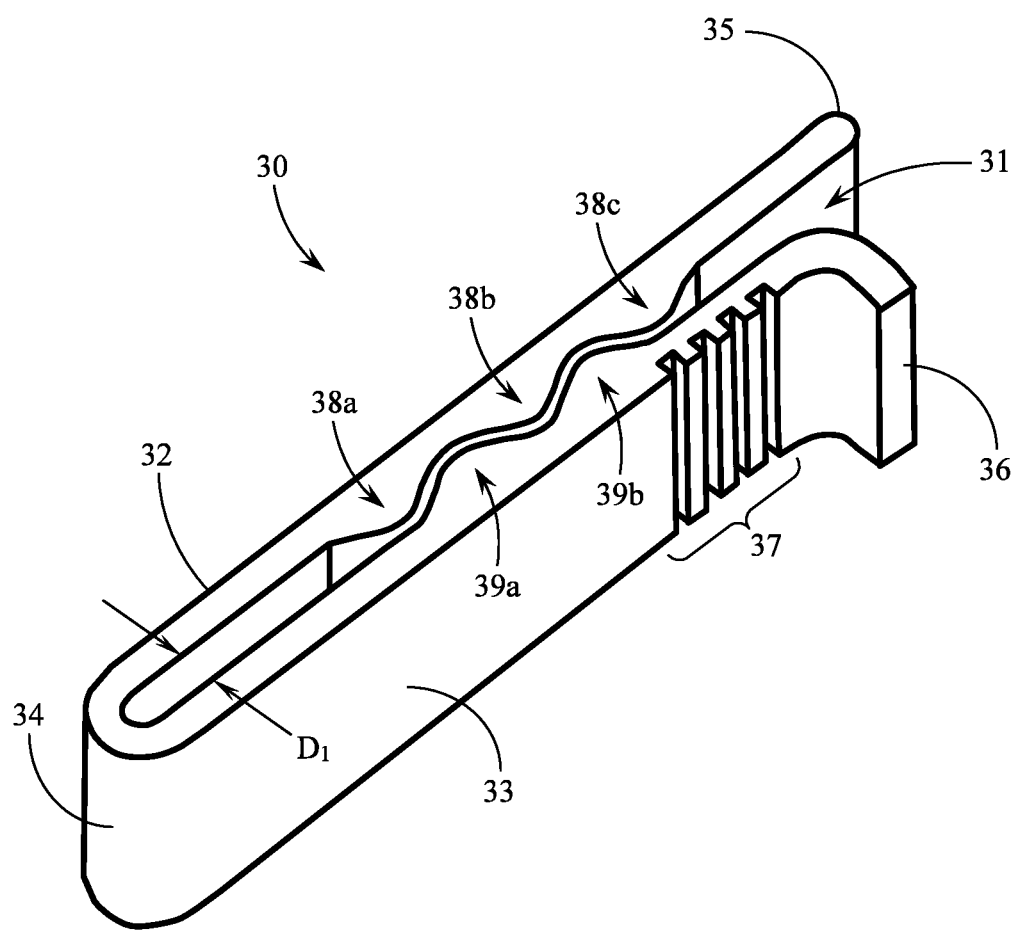
FIG. 4 is a perspective view of an alternate preferred embodiment of the clothing cuff clip of the present invention shown without the optional contamination indicator.

Reference is next made to FIG. 4 for a description of an example of an alternate embodiment of the clothing cuff clip of the present invention. FIG. 4 is a perspective view of an alternate preferred embodiment of the clothing cuff clip shown without the optional contamination indicator. In this alternate embodiment, cuff clip 30 is seen to be constructed primarily of first clip member 32 and second clip member 33. Clip members 32 & 33 are preferably constructed from a shaped band of rigid or semi-rigid material such as a hard plastic or metal that, in this case, is flat on one face (external) and rippled on the opposite face (internal). As in the first preferred embodiment, clip members 32 & 33 are preferably part of a single band of material that is shaped to form "U" shaped clip base 34 which establishes a 180 degree bend in the material. An upper end of clip member 32 forms clip top tab 35 which extends beyond an upper edge of clip member 33. Clip member 33 terminates in clip lift tab 36 which, as in the preferred embodiment, is simply a 90 degree bend in the terminal edge of the clip member. Prior to use, clip opening 31 is preferably closed by interior ripples 38a-38c in contact with interior ripples 39a & 39b, again as a result of the residual spring force left in the clip structure during manufacture and opens slightly under modest force when the user directs the edge of the clothing cuff into the opening. Ridges 37 provide a tactile surface that facilitate placement of the clip on the pants leg cuff.

Other mechanisms for increasing the grip that the clip has on the fabric layers in the bunched or rolled up cuff are possible. The embodiment shown in FIG. 4 improves the grip by increasing the contact surface area and directing the frictional contact force in multiple directions through the use of rippled surfaces on the internal faces of the clip members. Other structures on the internal faces of the clip members that achieve these same effects could be implemented. An increased gripping force must, however, be balanced against the ease with which the clips are placed and positioned on the cuff. It is anticipated that in general the user would put the clips in place while the pants are being worn, although this is not necessary to proper placement of the clips. In any case, the gripping force achieved by the combination of the residual spring force in the clip and the friction increasing mechanism internal to the clip, is balanced against the ease with which the clip opens to receive the one or more layers of fabric making up the pants leg cuff.

Figure 5:
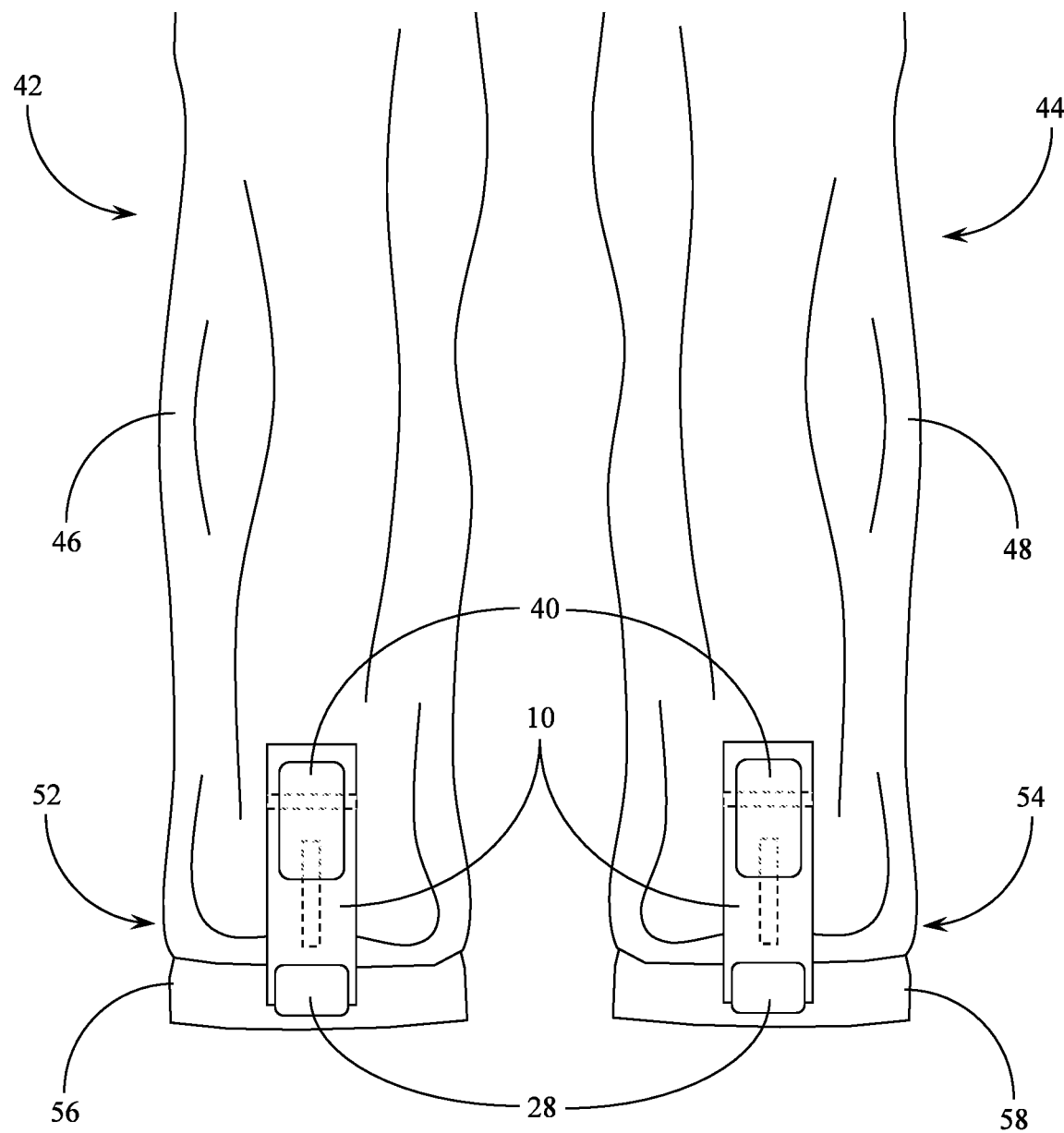

Reference is finally made to FIG. 5 which is an elevational view from the rear of an individual wearing two of the clothing cuff clips of the present invention on the pants leg cuffs typically associated with scrubs uniform pants used in healthcare facilities and the like. Each leg 42 & 44 of the individual user is covered with the fabric of the typical scrubs pants legs 46 & 48 as shown. The bottom cuffs 52 & 54 of the scrub pants fall (as is typical) around the heels of the shoes 56 & 58 of the wearer. Cuff clips 10 are positioned as shown on the bottom rear edge of each pants cuff with the contamination indicators 28 oriented downward to make first contact with the floor surface. The second (shorter) clip member of each clip 10 is positioned on the inside of the cuff of the pants leg (as seen in broken line format in the view of FIG. 5), while the first (longer) clip member is positioned on the outside of the cuff. Once again, the mechanism involving the press-through aperture and the press-through ridges (seen in broken line format in FIG. 5) provide enough compression force to the spring loaded clip to maintain the clips securely in place during use.

Additionally disclosed in FIG. 5 is an optional use of the flat external surface of the first clip member with its preferred rearward orientation during use. Logo indicia 40 may be optionally positioned on this flat surface and may provide visual indications of anything from the name of the healthcare facility to other sponsored branding elements. Indicia 40 may be directly printed on the first clip member or may be put in place as a permanent or removable label. Alternately, indicia 40 may provide a reference color chart adjacent contamination indicator 28 to provide the user with a comparison reference to determine how much contamination has occurred and when to change to a new clip.

Although the present invention has been described in terms of the foregoing preferred embodiments, this description has been provided by way of explanation only and is not intended to be construed as a limitation of the invention. Those skilled in the art will recognize modifications of the present invention that might accommodate specific articles of clothing or the identification of the presence of specific contaminants within specific environments. Those skilled in the art will further recognize alternate structures for removably securing the clip to the fabric material of the article of clothing that may be specific to the fabric from which the clothing is made. Such modifications, as to structure, orientation, geometry, and even composition and construction techniques, where such modifications are coincidental to the type of clothing or the environment present, do not necessarily depart from the spirit and scope of the invention.

I claim:

1. A clothing clip for interacting with and limiting contact between an item of clothing and a floor surface that is being traversed by an individual wearing the item of clothing, the clothing clip comprising:
   (a) a generally flat back clip member;
   (b) a generally flat front clip member positioned in spaced parallel relationship with the back clip member;
   (c) a clip base member extending between and connecting the back clip member to the front clip member, the clip base member having a floor contacting face;
   (d) a press through ridge configured on one of the back or front clip members, the press though ridge aligned with a press through aperture structured through the parallel opposing clip member; and
   (e) a contamination indicator positioned on the floor contacting face of the clip base member, the contamination indicator comprising a material that changes in appearance with an accumulation of compounds picked up from the floor surface during use of the clothing clip;
wherein when the clothing clip is positioned on a lower edge of the item of clothing being worn by the individual, floor contacting face of the clip base member prevents at least part of the lower edge of the item of clothing from contacting the floor.

2. The clothing clip of claim 1 wherein the press through ridge is configured on the front clip member and is aligned with the press through aperture structured through the back clip member, the press through ridge comprising a single raised edge with a plurality of corrugations and having a width incrementally less than a width of the press through aperture.

3. The clothing clip of claim 1 wherein the back and front clip members comprise a polymer plastic material.

4. The clothing clip of claim 1 wherein the back and front clip members comprise an aluminum metal material.

5. The clothing clip of claim 1 wherein the back and front clip members comprise a stainless steel metal material.

6. The clothing clip of claim 1 wherein the contamination indicator comprises an absorbent polymer substrate impregnated with one or more color change compounds.

7. The clothing clip of claim 1 wherein the contamination indicator comprises a moisture indicator.

8. The clothing clip of claim 1 wherein the contamination indicator comprises a pH indicator.

9. The clothing clip of claim 1 wherein the contamination indicator is removable from the floor contacting face of the clip base member, whereby the contamination indicator may be replaced after a period of use.

10. The clothing clip of claim 1 wherein the contamination indicator extends across the floor contacting face of the clip base member and at least partially up the front clip member so as to be visible when the clothing clip is in use.

11. The clothing clip of claim 1 further comprising a reference color chart panel positioned on an outward face of the front clip member adjacent the visible portion of the contamination indicator, whereby the user may compare a color change in the contamination indicator with the reference color chart panel to determine a degree of contamination.

* * * * *